United States Patent [19]

Hissen et al.

[11] Patent Number: 5,876,803

[45] Date of Patent: Mar. 2, 1999

[54] PROCESS AND DEVICE FOR CONTROLLING A MULTIPLICITY OF SPRAY TOOLS USED IN SURFACE COATING OF VEHICLES OR PARTS THEREOF

[75] Inventors: Hans Hissen, Darmstadt; Hans Schumacher, Stuttgart, both of Germany

[73] Assignee: Cegelec AEG Anlagen—und Automatisierungstechnik GmbH, Frankfurt, Germany

[21] Appl. No.: 648,161

[22] PCT Filed: Nov. 21, 1994

[86] PCT No.: PCT/EP94/03844

§ 371 Date: May 21, 1996

§ 102(e) Date: May 21, 1996

[87] PCT Pub. No.: WO95/14961

PCT Pub. Date: Jun. 1, 1995

[30] Foreign Application Priority Data

Nov. 22, 1993 [DE] Germany ............................. 43 39 748

[51] Int. Cl.⁶ ................ B05D 1/02; B05D 7/04
[52] U.S. Cl. .................. 427/424; 118/313; 118/314; 427/8
[58] Field of Search ................. 427/424, 10, 8; 118/313, 314, 323

[56] References Cited

U.S. PATENT DOCUMENTS 4,262,336  4/1981  Pritchard .
4,721,630  1/1988  Takeo et al. ............................. 427/424
4,977,000  12/1990  Murayama et al. .................... 427/424
4,985,283  1/1991  Ogata et al. ............................ 427/424
5,372,856  12/1994  Ogasawara .............................. 427/424
5,427,822  6/1995  Bracciano ............................... 427/424

FOREIGN PATENT DOCUMENTS 2945660  10/1980  Germany .
1556013  11/1979  United Kingdom .

*Primary Examiner*—Shrive Beck
*Assistant Examiner*—Bret Chen
*Attorney, Agent, or Firm*—Venable; George H. Spencer; Norman N. Kunitz

[57] ABSTRACT

The subject matter of the invention is a process for controlling a multiplicity of spray tools for the surface coating of vehicles or parts thereof. With stored program control, the settings for the multiplicity of spray tool which determine the paint flow through each tool are issued centrally to the control elements associated with the spray tools. The trajectory points for the tools, which are stored with coarse spacing or obtained by coarse interpolation from already stored trajectory points, are applied as reference values to the attitude controllers serving each spray tool; from the said position controllers, additional trajectory points are determined by fine interpolation between the transmitted trajectory points and processed in the position controller by means of actual position values.

5 Claims, 4 Drawing Sheets

PROCESS AND DEVICE FOR CONTROLLING A MULTIPLICITY OF SPRAY TOOLS USED IN SURFACE COATING OF VEHICLES OR PARTS THEREOF

BACKGROUND OF THE INVENTION

The invention relates to a method and an arrangement for controlling a plurality of spray tools in a coating line by means of a coating control comprising a centralized control with stored program capability which releases setting magnitudes determining the paint throughput of each spray tool to actuators for the spray tools which, during coating, are moved by drives along paths whose beginning and end depends on signals from the control with stored program capability, with vehicles or parts thereof being moved through the coating line.

A method of the type described above is known from GB A-1 556 013. In a coating station, the known arrangement comprises a vertically movable spray tool for each side and a horizontally movable spray tool for the top side of automobile bodies. Each spray tool is connected to its own comparator control in which six linear movement paths of different lengths are stored for the associated spray tool by their beginning and end points. The control with stored program capability, which is connected to the comparator controls of the spray tools in a star-shaped manner, respectively selects one of these previously stored linear movement paths via a corresponding signal which is decoded in the comparator control. Then, the comparator control compares the signals generated by sensors with the beginning and end points of the movement path selected by the control with stored program capability and respectively releases or blocks the spray tools when the beginning and end points are reached.

Also known is a numerical control for the synchronous movement of machine drives, comprising a centralized computer which, via a parallel main computer bus, is connected to secondary computers respectively provided by a motor control and to a secondary computer control connected to each secondary computer via a second bus. The relatively slow centralized computer calculates interpolation points from stored command data. Sets of interpolation points are respectively transmitted to the secondary computers from the centralized computer. The secondary computers extrapolate the received interpolation data by iteration and generate motor drive signals. The secondary computer control synchronizes the operation and the temporal operating steps of the main computer and of the secondary computers (U.S. Pat. No. 4,262,336).

Finally, a method and an arrangement for determining an at least partially curved movement path of a tool are known by means of which the intermediate points disposed between path support points are determined by way of interpolation. The curved path segments disposed in-between two path support points are first approximated by parallel arcs which are then approximated by a progression by means of Linewinter polation (DE-A-29 45 660).

In automobile bodies, many parts, e. g., the outer sides of the roof, the doors, the hood and the tail, have uniform part geometries. These parts are coated with automatic coating machines, particularly by way of electrostatic spraying. The automatic coating machines have a plurality of spray tools past which the automobile bodies are moved. Frequently, drive and control devices having several axes are employed to arrange the spray tools at distances and angles that are suitable for coating. The spray tools are moved along predetermined paths which depend on the shape and speed of the parts to be coated.

For surface coating, pneumatic or electrostatic coating processes may be used. In the pneumatic spraying processes, the paint material is atomized in spray guns. In electrostatic spraying processes, an electrostatic field with a high direct voltage is generated between the spray tool and the object to be coated.

During the movement of the automobile body in the coating station, spray tools for the top surfaces and the side surfaces of the bodies are usually in operation simultaneously. The top surfaces and the side surfaces differ in their geometry. Additionally, the top and the side surfaces have different slopes with respect to the horizontal or vertical. Therefore, in order to properly coat the top and side surfaces, the spray tools must be moved at different speeds and be guided along different paths. Other parameters, e.g., paint consumption per time unit, may also vary from one spray tool to another.

For cost-efficiency reasons, automatic coating machines are used that have a plurality of spray tools, all or most of which are in operation at the same time. The spray tools must be positioned at distances and angle positions that are as optimal as possible with respect to the surface part that is to be coated in order to accomplish a uniform paint application. Therefore, it is necessary to position or move at least some of the spray tools independently of one another in terms of their positions and angles in space. For example, the spray tools are oriented perpendicularly onto the respective surface to be coated at uniform distances.

The controls for the spray tools or their drives comprise data for coating patterns which are allocated to surfaces of different shapes. These data relate to the settings of the spray tools and of the paths to be traversed by these tools during the relative movements between the spray tools and the surfaces to be coated. The programming of the controls takes place, for example, in situ or in a separate coating station with the aid of the Teach-In method. Off-line programming is also possible, at least for obtaining coarse path data which can then be corrected, for example, by way of the Teach-In method.

It is now the object of the invention to provide a method and an arrangement for controlling a plurality of spray tools for the surface coating of vehicles or parts thereof, wherein the expenditure for the control is low in spite of the simultaneous operation of several spray tools and precise positioning of the spray tools during the coating process.

SUMMARY OF THE INVENTION

In a method of the type described at the outset, the above object is achieved according to the present invention in that spray tools are controlled in different stations of the coating line, that path points to which the spray tools are to be moved in two or more axial directions of the Cartesian system of coordinates, which points are stored in the control with stored program capability with coarse graduation or are obtained from stored path points, are transmitted as set values via a serial bus to position control circuits with the drives for the spray tools, that the position control circuits are provided with cascade speed control circuits which store the set values on an intermediate basis and, by fine interpolation, determine further path points between the transmitted set values as set values and process them with actual position values, and that the position controllers respectively determine the speed for the rpm of the drives from the difference between successively transmitted set values and the time interval between the transmission of these set values. In this method, the generation of set values for the position controllers or sequence controllers are centrally and digitally generated in coarse form, for which purpose a control with stored program capability suffices which particularly comprises a microprocessor. By way of the generation of coarse set values, the computing expenditure is reduced in a centralized location. The fine interpolation is carried out by the position controllers themselves. For this purpose, the position controllers or sequence controllers are provided particularly with their own microprocessors. The fine interpolation may take place in a desired, dense sequence of the path points. Here, due to the intermediate storage, the control with stored program capability and the processors in the sequence controllers can work without interruptions in time so that the control components are optimally utilized.

The movement of spray tools with path speeds of 2 to 4 m/min according to the above-described method is particularly advantageous. Advisably, these are electrostatically operating spray tools. At these speeds, the path data, which are stored or coarsely interpolated in the form of a list, are released to a bus controller, preferably at time intervals of 100 to 200 msec. A transmission of new path points to the respective position controller may advisably take place at time intervals of approx. 10 msec. It turned out that, if the operation takes place in the above described ranges, a high-quality electrostatic coating with low material consumption can be accomplished with a minimum of control engineering expenditure.

It is particularly advantageous if, for objects to be coated which essentially differ only in their contour, existing movement programs for the paths to be traversed are utilized. Here, the coarsely specified path points to which the respective spray tool is to be moved are stored as a function of the length of the objects, at least in one direction in which the objects have the same shape, whereas the coordinates in the other direction are adapted to the different dimensions of the objects. Here, it is not necessary to prepare a separate movement program for each object. Furthermore, symmetry properties of the objects can be utilized in so far as, for example, for the right hand and left hand side surfaces, path data are used that are adapted to the symmetrical shape. In this manner, the computing expenditure in the centralized control with stored program capability can be reduced considerably. Therefore, a control with stored program capability having a slow operating speed can be used. Alternatively, the centralized control with stored program capability can also assume other functions.

An arrangement for implementing the above-described measures of the method is embodied according to the invention such that the spray tools are arranged in different stations of the coating line, that the control with stored program capability, wherein path points to which the spray tools are to be moved in two or more axial directions of the cartesian system of coordinates are stored as set values with coarse graduation and/or are determined by coarse interpolation from the stored path points, is connected via a serial bus with position controllers of which one each is allocated to a movement axis of the respective spray tool and comprises a cascade speed control circuit as well as at least one microprocessor which stores the set values destined for the position controller on an intermediate basis and determines path points by way of fine interpolation from the set values transmitted on the bus, which path points are used as set values as a basis for the position control, and that the position controller respectively calculates a difference from two successive set values from which the speed for the rpm's of the drives is determined by division by the time interval of the transmission of these set values. In the following, the invention is described in greater detail by way of an embodiment shown in the drawing, from which embodiment ensue further details, characteristics and advantages.

DETAILED DESCRIPTION OF THE PREFERRED EMBODIMENTS

Figure 1:
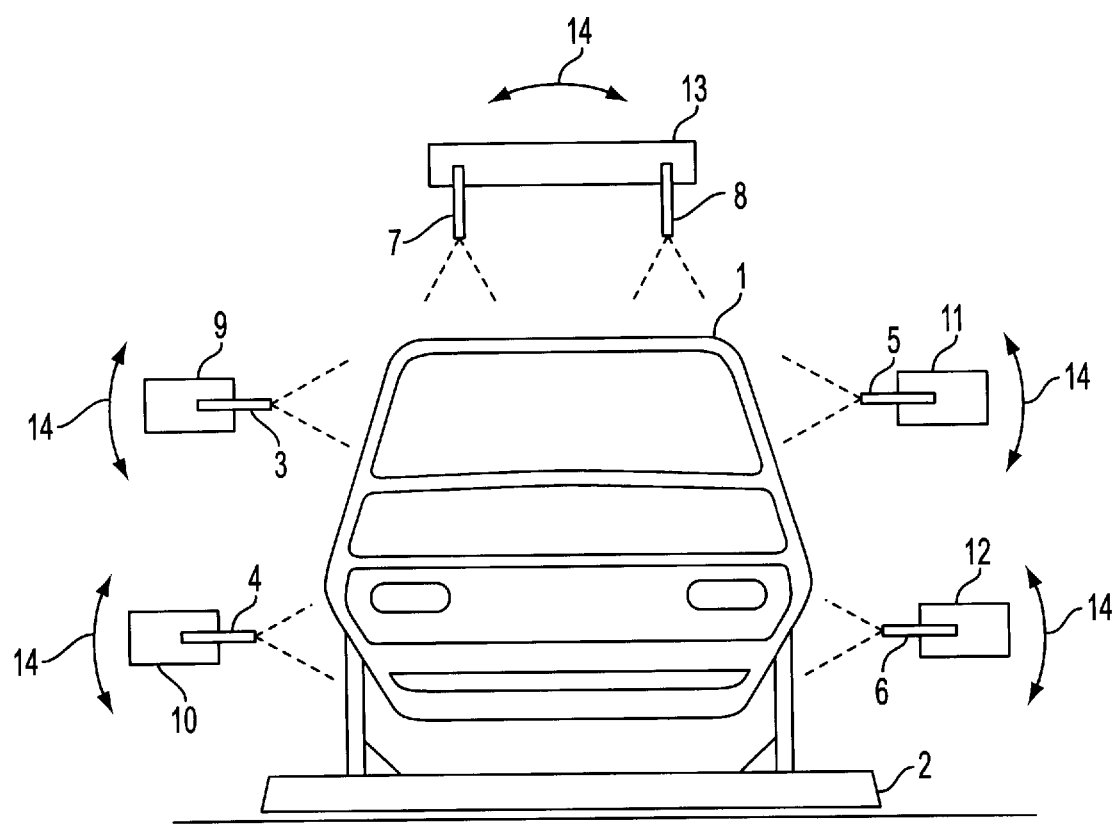
FIG. 1 schematically shows a coating station for motor vehicle bodies in a front view.

A coating station for the coating of automobile bodies 1 transported on a carrier 2 through the coating station comprises two electrostatically operating spray tools 3, 4 or 5, 6 for each side of the automobile body 1 and two electrostatically operating spray tools 7, 8 for the hood, the roof and the tail of the automobile body 1.

The spray tools 3, 4, 5, 6 are fastened to carriers 9, 10, 11, 12, respectively, which can move to three-dimensional points in space. The two spray tools 7, 8 are fastened to a joint carrier 13 which can also be moved three-dimensionally in space. Three drives each, not shown, are provided for moving the carriers 9 to 13. Each drive is intended for the movement in one axis of a Cartesian system of coordinates. The option of displacing the carriers 9 to 13 in two directions of the system of coordinates is shown by arrows 14 in FIG. 1. But, in many cases, a movement option in the third direction of the system of coordinates is also available. Furthermore, the spray tools 9 to 13 are often embodied so as to be pivotable around one or several axes.

Figure 2:
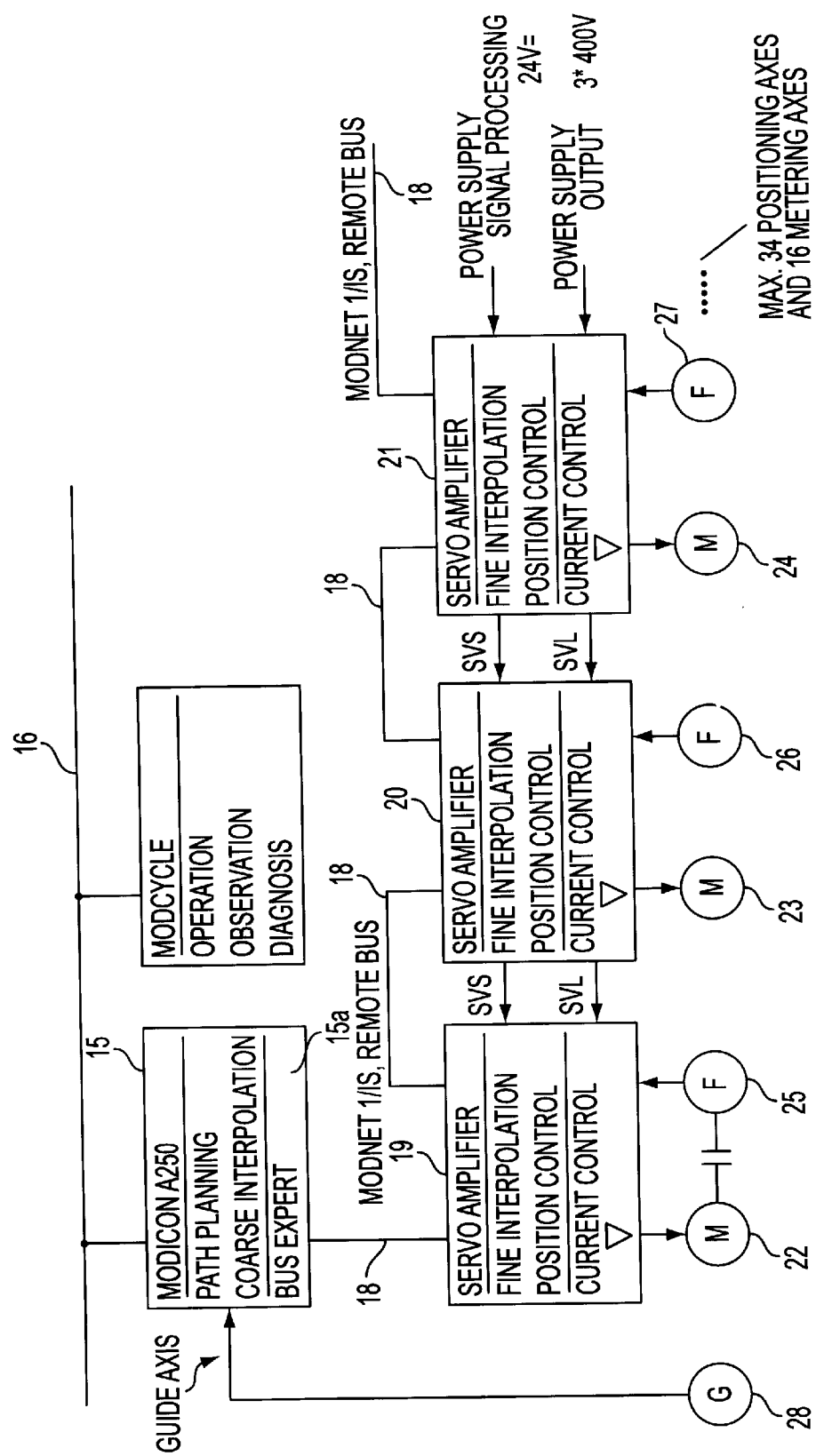
FIG. 2 is a block diagram of a control for the coating station according to FIG. 1.

FIG. 2 shows a block diagram of a control for the spray tools 9 to 13. The control comprises a control 15 with stored program capability, namely a control having a freely programmable digital computer which may be embodied as a microprocessor or microcomputer. The control 15 is connected to a higher ranking control unit via a bus 16. The coating station shown in FIG. 1 actually only shows a portion of the coating line comprising further processing stations, e.g., for the cleaning and coating of other surfaces of the interior compartment of the automobile body. The higher ranking control unit coordinates the operation of the different stations of the coating line.

The control 15 with stored program capability is connected via a serial bus 18 with position controllers 19, 20, 21. The transmission on the bus is carried out by a bus expert 15a. FIG. 2 only shows three such position controllers which are allocated to the drives, e.g., of the spray tool 3. In the control circuit, the position controller 19 comprises a servomotor 22 as actuator which drives the carrier 9, e.g., in the direction of the X-axis of a Cartesian system of coordinates. In the control circuit with the position controller 20, a servomotor 23 is provided which drives the carrier 9 in the direction of the Y-axis of the Cartesian system of coordinates. In the control circuit of position controller 21, there is disposed a servomotor 24 which drives the carrier 9 in the direction of the Z-axis of the cartesian system of coordinates. Accordingly, the carriers 10, 11, 12 and 13 are connected with servomotors for the movement in three axial directions. The servomotors for the drive of the carriers 10, 11, 12, 13 are arranged in control circuits with position controllers in the manner described above in connection with carrier 9. For some applications, movements in only two axial directions of the cartesian system of coordinates also suffice. In this case, two motors each are sufficient for driving a carrier. The position controllers 19 to 21 comprise digital computers, e.g., respectively a microprocessor or microcomputer with an interface to the serial bus 18. Furthermore, the position controllers respectively comprise speed controllers with an rpm and current control for the electric motors 22 to 24. Actual position value transmitters 25, 26, 27 are connected to the motor 22, 23, 24, respectively.

The control 15 with stored program capability, in the following also identified as an SPS or programmable controller 15, is connected with a speed transmitter 28 which measures the transport speed of the automobile body 2.

Further transmitters, not shown in detail, indicate positions of the automobile body 2 to the SPS 15 which are decisive for the beginning and the end of the coating process. The transmitter for indicating the beginning is furthermore arranged in a position such that the spray tools can be moved from their rest positions into the operating positions before the automobile body 2 reaches the region of spray tools 9 to 8.

Figure 3:
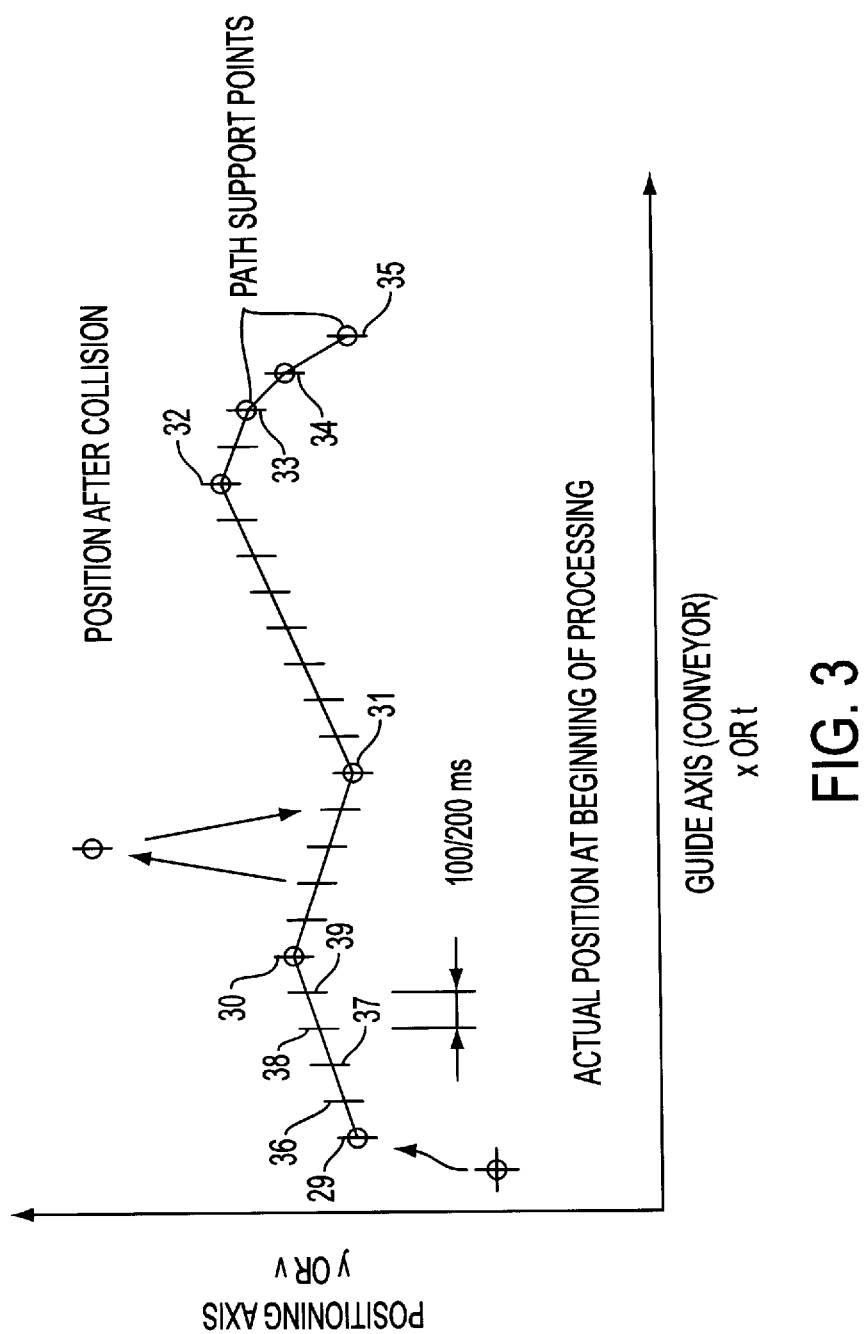
FIG. 3 shows path points which are stored or interpolated in a central processing unit of the control as set values of a path in which a spray tool is moved by the drive of an axis.

The SPS 15 stores the paths to be traversed by the spray tools 3 to 8 for the coating of the automobile body 2 in the form of path points in the respective axes of the system of coordinates. The path points are stored in the memory of the SPS 15, preferably in lists. FIG. 3 shows several path points 29, 30, 32, 33, 34, 35 of a path to be traversed by spray tool 3 in the X-Y-direction. The path points 29 to 35 set respectively the beginning or end of prominent path points and may be at different distances from one another, not only in the X-direction but also in the Y-direction. The X-direction shown in FIG. 3 corresponds, e.g., to the direction of conveyance of the automobile body 2.

From the path points 29 to 35 that are predetermined, for example, manually or by a higher ranking unit, the SPS 15, by way of coarse interpolation, determines equidistant path points in the X-direction whose coordinate values are released as set values to the sequence controller 22 or 23.

FIG. 3 only identifies the path points 36, 37, 38 and 39 which were additionally computed by the SPS 15 between the path points 29 and 30 by way of coarse interpolation according to known interpolation methods.

The path points obtained by coarse interpolation and the path points 29 to 31 are transmitted to the position controllers 19, 20 in agreement with the bus protocol of the serial bus 18. Similarly, the SPS 15 determines further path points from predetermined path points for the position controllers of the spray tools 4 to 8 by way of coarse interpolation and transmits them in a time-multiplex manner to the sequence controllers according to the bus protocol. Transmission takes place asynchronously.

The position controllers take over the set values addressed to them, which values correspond to a coarse interpolation, they store them and they generate further set values of a path between successive set values by way of fine interpolation according to known interpolation methods. In this manner, they relieve the SPS 15 of the computing expenditure and the bus of a high data throughput, as would be necessary in case of a predetermined input for high-quality coating at high transport and spray tool speeds.

Figure 4:
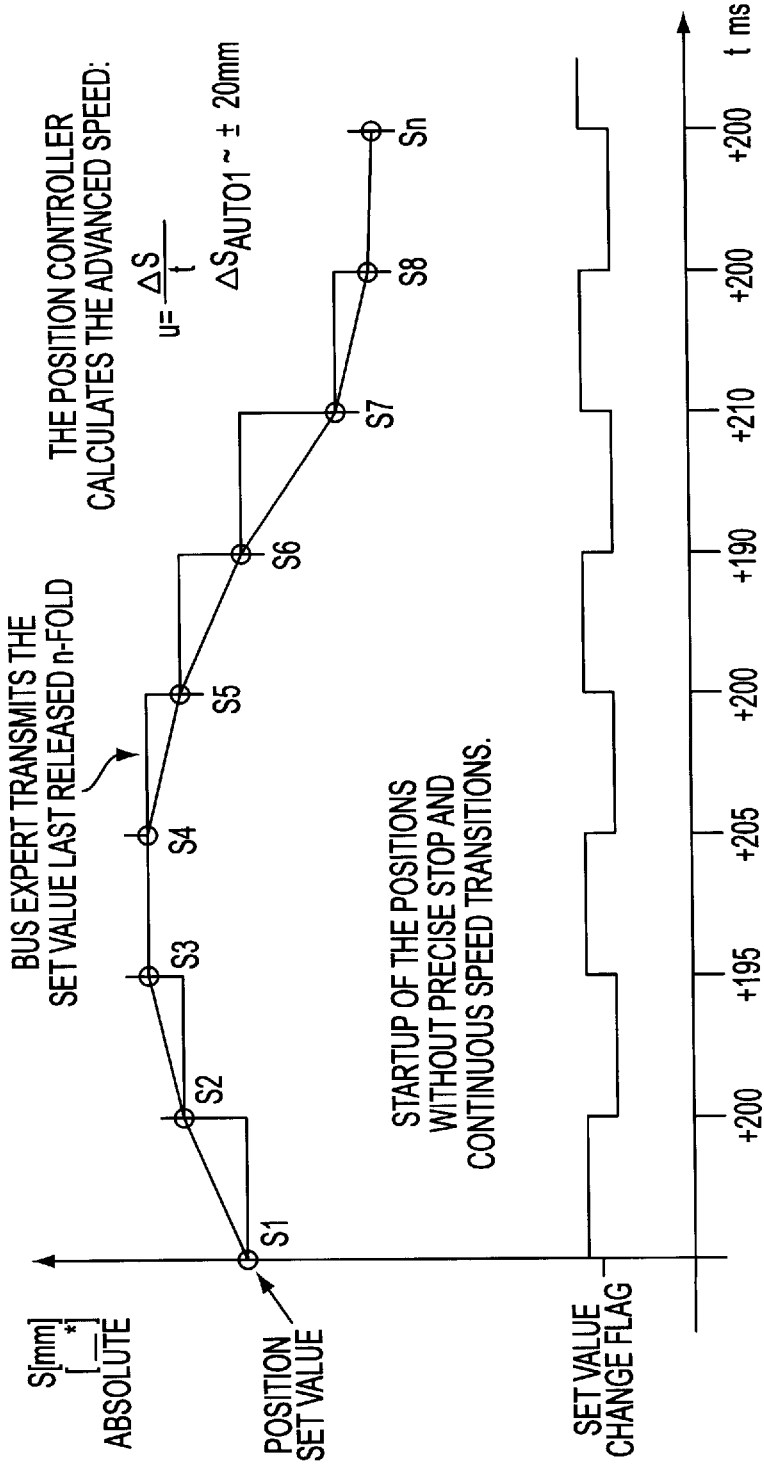
FIG. 4 shows the set values transmitted to a position controller from the central unit, from which set values of path points for the drive of an axis are generated by way of fine interpolation.

FIG. 4 illustrates for the position controller 19 the coarsely interpolated set values between a path section determined by a path point S1 and a path point Sn. Here, the path sections S1, Sn apply to the X-direction. FIG. 4 shows the temporal generation of the set values S2, S3, S4, S5, S6, S7 and S8. Respectively one set value S1 . . . Sn is predetermined for the position controller which implements the fine interpolation based on the actual value measured by the position transmitter 25 and tracks carrier 9 to reduce the control deviation.

The position controller 19 comprises an underlying rpm control circuit whose rpm is determined from the time interval of successively transmitted set values. The set values are transmitted successively in time via the bus 18. Within the grid, the set values obtained by way of coarse interpolation may change, but they must not change. The position controller 19 calculates a difference from respectively two successive set values from which difference the speed or rpm of the drive motor 22 is determined by way of division by the time interval between the set values. The fine interpolation is carried out by way of a known interpolation method.

RS 485 interfaces are used for the bus 18, with it being possible to provide transmission rates of up to approximately 2 MBd. The SPS 15 comprises specifically only one microprocessor for control and computing tasks, e.g., a processor of the type Intel 80486.

The carriers 9 to 13 with the associated drives are each preferably designed for speeds of 2 to 4 m/min. The coarsely interpolated set values are related to path sections of approximately 1 to 2 cm.

For a precise path guidance of the spray tools, it is sufficient if new set values can be interpolated at intervals of 100 to 200 msec and be transmitted on the bus 18 and if the number of spray tools does not exceed approximately 12 to 16 (30 axes). The bus expert requires less than 100 to 200 msec for the transmission, e.g., only approx. 10 msec., and therefore successively transmits the same coarsely interpolated values in a multiple synchronous manner.

A commercially available automation device having the above-noted properties can be used as SPS 15, wherein a storage capacity of approximately 4 MB suffices for the memory of the automation device. With the above-mentioned path speeds and given strokes of 2–3 m, particularly electrostatically operating spray tools are moved during the coating of automobile bodies.

As was already mentioned, the position controllers 22 to 24 comprise a working computer for the fine interpolation as well as for the position and speed control. The speed control circuit is a cascade control with respect to the position control circuit. Direct current or alternating current motors can be used as drive motors 22, 23, 24. The drive motor can assume monitoring and diagnostic tasks and transmit corresponding messages to the SPS 15.

Among the essential tasks of the SPS 15 is also the predetermined input of setting values determining the paint throughput of the spray tools. Compared to the set values, these setting values do not change much. The coating is influenced by a plurality of parameters such as the geometry of the spray tools, the spray tool path and the automobile body, the paint throughput speed, the paint throughput quantity per time unit, the atomization air and the horn air, the electrical field strength, the viscosity as well as the climatic conditions of the coating station. The setting values for the spray tool are determined in advance for the respective object and they are stored.

We claim:

1. Method for controlling a plurality of spray tools disposed at different stations of a coating line for vehicles or parts thereof being moved through the coating line, with the method utilizing a coating control comprising a centralized control with stored program capability which releases setting magnitudes determining the paint throughput of each spray tool to actuators for the spray tools which, during coating, are moved by respective drives along paths whose beginning and end depends on signals from the control with stored program capability, said method comprising the steps of:

transmitting path points to which the spray tools are to be moved in two or more axial directions of a Cartesian system of coordinates, which path points are stored in the control with stored program capability with coarse division of a path segment or are obtained from stored path points by course interpolation between the stored points of a path, with said path points being transmitted as set values via a serial bus to respective position control circuits for respective drives for the spray tools;

intermediately storing the transmitted respective set values in the respective position control circuits, which are provided with cascade speed control circuits;

within the respective position control circuits, determining, by a further fine interpolation, further path points between the transmitted and intermediately stored respective set values as further set values, and processing the respective determined further set values with actual position values to position the respective spray head; and, determining, in the respective position control circuits, the speed for respective drives from the difference between successively transmitted and stored respective set values and the time interval between the transmission of these successively transmitted set values.

2. Method according to claim 1, wherein the spray tools are moved at a speed of 2 to 4 m/min and the transmitted coarsely interpolated or divided path values are generated at path distances in a time grid of 100 to 200 msec.

3. Method according to claim 2, wherein the transmitted set values are transmitted to the respective position controllers at time intervals of 10 msec.

4. Method according to claim 1, wherein the transmitted coarsely interpolated or divided path values are transmitted to the position controllers at time intervals of 10 msec.

5. Arrangement for controlling a plurality of spray tools disposed at different stations in a coating line for vehicles or parts thereof being moved through the coating line; said arrangement comprising, in combination:

a centralized control with stored program capability which releases setting magnitudes determining the paint throughput of each spray tool to respective actuators for the spray tools which, during coating, are moved by respective drives along paths whose beginning and end depends on signals from the centralized control with stored program capability; said centralized control with stored program capability further including means for transmitting path points to which the spray tools are to be moved in two or more axial directions of a cartesian system of coordinates and which path points are stored as set values with division between end points of a path segment or are determined by coarse interpolation from stored end path points of a path segment, via a serial bus to respective position controllers of which one each is allocated to a movement axis of a respective spray tool and each comprises a cascade speed control circuit as well as at least one microprocessor means for storing the respective transmitted set values destined for the respective position controller on an intermediate basis, for determining further path points between successive transmitted set points by a further fine interpolation from the respective stored set values transmitted on the bus, for using the determined further path points as set values as a basis for the position control of the respective spray device, and for calculating a difference from two successive transmitted respective set values and determining the speed of the respective drives by division of the respective said difference by the time interval of the transmission of these two successive set values.

* * * * *